US006867808B1

(12) United States Patent
Boden

(10) Patent No.: US 6,867,808 B1
(45) Date of Patent: Mar. 15, 2005

(54) TIME DOMAIN IMAGER

(76) Inventor: Scott T. Boden, 1600 Lundington La., LaJolla, CA (US) 92037

(*) Notice: Subject to any disclaimer, the term of this patent is extended or adjusted under 35 U.S.C. 154(b) by 0 days.

(21) Appl. No.: 09/531,542

(22) Filed: Mar. 20, 2000

Related U.S. Application Data
(60) Provisional application No. 60/125,153, filed on Mar. 19, 1999.

(51) Int. Cl.[7] .............................................. G03B 13/00
(52) U.S. Cl. ....................................... 348/348; 348/302
(58) Field of Search ................................. 348/348, 302, 348/308; 356/5.01, 5.08

(56) References Cited

U.S. PATENT DOCUMENTS

| | | |
|---|---|---|
| 4,131,021 A | 12/1978 | Mezrich et al. |
| 4,277,167 A | 7/1981 | Eppel |
| 4,399,704 A | 8/1983 | Gardineer et al. |
| 4,547,055 A | 10/1985 | Ehrenfried |
| 4,557,145 A | 12/1985 | Perdijon |
| 4,621,292 A * | 11/1986 | Hirao et al. ................. 348/348 |
| 4,695,893 A * | 9/1987 | Makino et al. ............. 348/348 |
| 4,708,473 A | 11/1987 | Metzdorff et al. |
| 4,764,982 A | 8/1988 | Pfund |
| 4,835,688 A | 5/1989 | Kimura |
| 4,854,698 A | 8/1989 | Schmidt |
| 5,031,049 A | 7/1991 | Toyama et al. |
| 5,056,914 A | 10/1991 | Kollodge |
| RE33,865 E | 3/1992 | Knight et al. |
| 5,157,451 A | 10/1992 | Taboada et al. |
| 5,162,861 A | 11/1992 | Tamburino et al. |
| 5,168,298 A | 12/1992 | Hirai |
| 5,216,259 A | 6/1993 | Stern et al. |
| 5,249,157 A | 9/1993 | Taylor |
| 5,446,529 A | 8/1995 | Stettner et al. |
| 5,467,122 A | 11/1995 | Bowker et al. |
| 5,467,223 A | 11/1995 | Cleveland, Jr. et al. |
| 5,523,835 A | 6/1996 | Tanaka |
| 5,574,552 A | 11/1996 | Dunne |
| 5,633,706 A | 5/1997 | Cho et al. |
| 5,655,160 A | 8/1997 | Saito |
| 5,682,229 A | 10/1997 | Wangler |
| 5,694,203 A * | 12/1997 | Ogawa ....................... 348/348 |

(List continued on next page.)

FOREIGN PATENT DOCUMENTS

| WO | WO 01/22033 A1 | 3/2001 |
|---|---|---|
| WO | WO 02/057714 A1 | 7/2002 |

*Primary Examiner*—Wendy R. Garber
*Assistant Examiner*—Jacqueline Wilson
(74) *Attorney, Agent, or Firm*—Edell, Shapiro & Finnan, LLC

(57) ABSTRACT

The distance and external contour of objects are imaged using time domain measurement. An array of pixel cells receives a time-varying waveform (e.g., a ramp voltage) time synchronized to a transmitted light pulse. Each pixel cell senses light from the pulse that is reflected from objects in the field of view of the apparatus, and stores the value of the ramp voltage at the time the reflected light pulse is detected at that pixel cell. The ramp voltage at any time is known and therefore serves as a measure of the combined transmission and reflection times of the light pulse for each pixel cell. The speed of light is also known, therefore the stored voltage level at each pixel cell represents the distance between the apparatus of a portion of the object from which the light pulse is reflected. The stored pixel cell voltages can be delivered sequentially to a monochrome video monitor pursuant per any suitable video standard. The imaging technique of the present invention does not record or display the intensity of the reflected and received light; instead, the invention provides an output signal that is an x-y representation of the distance of the distance of viewed objects from the sensor pixel cells. The resulting scene on the display represents distances and external shapes of viewed objects, not patterns, shadings or textures.

22 Claims, 3 Drawing Sheets

U.S. PATENT DOCUMENTS

| | | |
|---|---|---|
| 5,696,577 A | 12/1997 | Stettner et al. |
| 5,729,584 A | 3/1998 | Moorman et al. |
| 5,739,901 A | 4/1998 | Fujioka et al. |
| RE35,798 E | 5/1998 | Kimura |
| 5,793,491 A | 8/1998 | Wangler et al. |
| 5,835,204 A | 11/1998 | Urbach |
| 5,880,777 A | 3/1999 | Savoye et al. |
| 5,892,575 A | 4/1999 | Marino |
| 5,953,110 A | 9/1999 | Burns |
| 6,137,566 A | 10/2000 | Leonard et al. |
| 6,323,942 B1 | 11/2001 | Bamji |

* cited by examiner

TIME DOMAIN IMAGER

CROSS REFERENCED TO RELATED APPLICATIONS

This application claims priority from U.S. provisional patent application serial No. 60/125,153, entitled "Focal Plane Time Domain Imager", filed Mar. 19, 1999. The disclosure of that provisional patent application is incorporated herein by reference in its entirety.

BACKGROUND OF THE INVENTION

1. Technical Field

The present invention pertains to a method and apparatus for imaging objects as a function of their distances from a source location.

The term "imaging" as used herein means representing an object in a manner such that its exterior contour and position are capable of perception. It is not limited to visual perception but instead can refer to a presentation of voltages or other parameters that are detectable and/or recognizable by a computer, processor or other signal responsive apparatus.

2. Discussion Of The Prior Art

In conventional CCD video systems, multiple light sensors are arranged in a rectangular array, each sensor measuring the intensity of light energy it receives from objects in its view. The measured light intensities are converted to corresponding voltages oriented in a raster scan, typically pursuant to the RS-170 video standard or other such standard, to create a video representation for viewing. By using the intensity of light received at the sensors, the system presents a visual image as it would be seen directly, with appropriate shading, texturing, surface patterns, etc. This conventional imaging approach does not provide acceptable depth perception in a viewable image. To provide depth perception it is known to utilize two spaced cameras arranged to provide a stereoscopic view, and then compare and process the two resulting pixilated images with sophisticated computer software. This is an expensive, complex and not always satisfactory arrangement.

For some imaging applications the requirements are only to provide accurate depth or distance information along with a simple outline of viewed objects. Examples of such applications are databases for virtual reality systems, security systems, or any computerized video applications in which depth or distance positions and outer contours of viewed objects are of greater importance than the object texture and shading.

OBJECTS AND SUMMARY OF THE INVENTION

It is an object of the present invention to provide a method and apparatus for providing accurate information regarding distance and external contour of objects for use in imaging those objects.

It is another object of the present invention to provide a method and apparatus for generating a signal representing the external contour of an object and the distance of that object from an imaging location.

A further object of the invention is to provide an image on a conventional video display wherein the brightness of each pixel on the display, instead of representing intensity of light, represents the distance of a portion of the viewed object from a scanner.

The aforesaid objects are achieved individually and in combination, and it is not intended that the present invention be construed as requiring two or more of the objects to be combined unless expressly required by the claims attached hereto.

In accordance with a preferred embodiment of the present invention, an array of pixel cells is provided, each cell receiving in common a time-varying waveform (e.g., a ramp voltage) that is time synchronized to the transmission of a pulse of light toward objects to be imaged. Each pixel cell includes a respective photodetector for sensing light from the pulse that is reflected from objects in the field of view of the apparatus. Each pixel cell stores the value of the ramp voltage at the time the reflected light pulse is detected at that pixel cell. The voltage of the time-varying waveform at any time (e.g., the slope of the ramp voltage) is known and therefore serves as a measure of the combined transmission and reflection times of the light pulse for each pixel cell. The speed of light is also known. Therefore, the stored voltage level at each pixel cell represents the distance from the apparatus of a portion of the object from which the light pulse is reflected. The stored pixel cell voltages can be delivered sequentially to a monochrome video monitor pursuant to any suitable video standard such as the RS-170 standard. The resulting scene on the display represents distances and external shapes of viewed objects, not patterns, shadings or textures.

It is important to note that the imaging technique of the present invention does not record or display the intensity of the reflected and received light. Instead, the invention provides an output signal that is an x-y representation of the distance of viewed objects from the sensor pixel cells.

The above and still further objects, features an advantages of the present invention will become apparent upon consideration of the following detailed description of specific embodiments thereof, particularly when taken in conjunction with the accompanying drawings wherein like reference numerals in the various figures are utilized to designate like components.

DESCRIPTION OF THE PREFERRED EMBODIMENT

Figure 1:
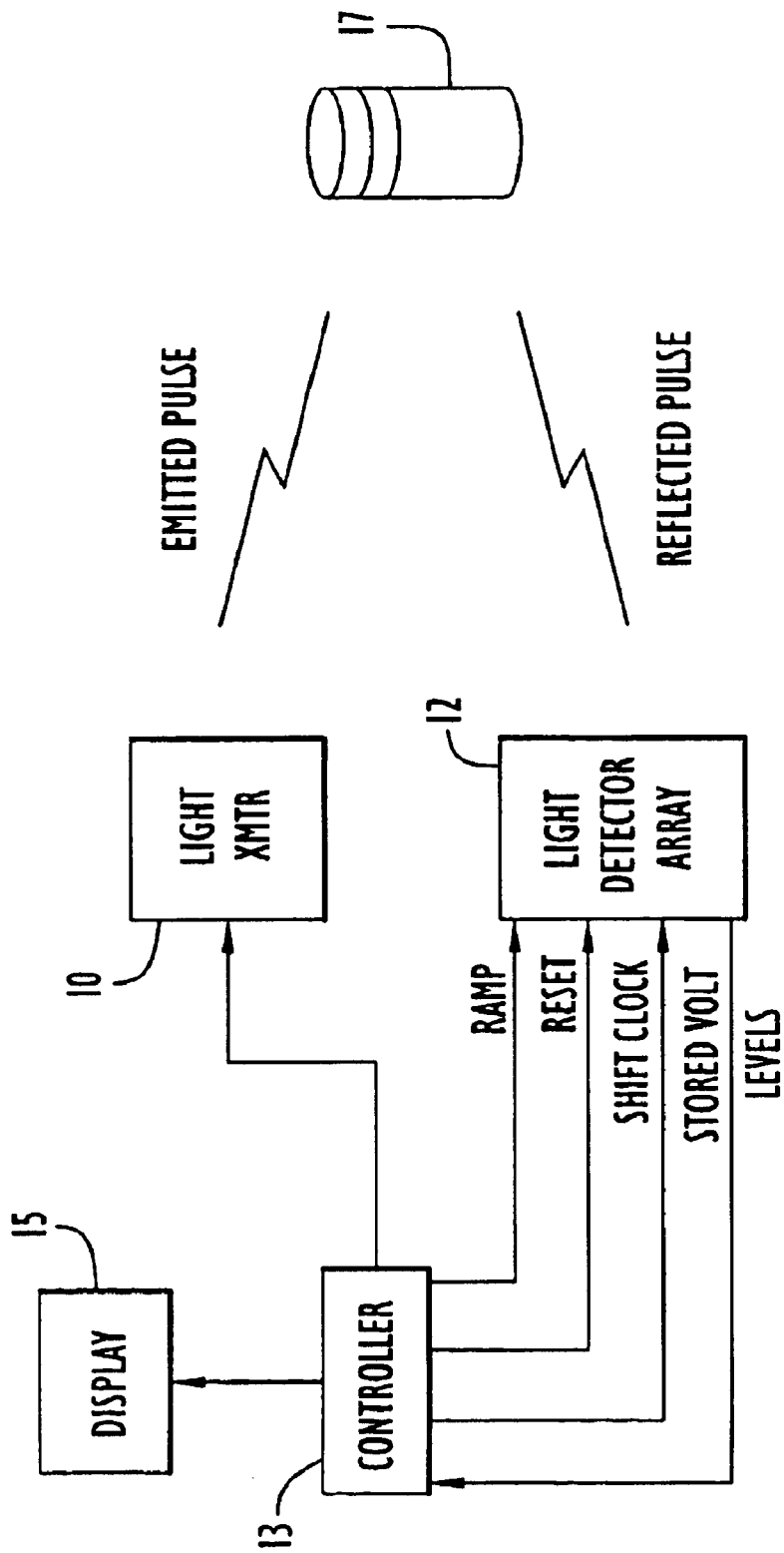
FIG. 1 is a block diagram of a preferred embodiment of the present invention.

Referring to FIG. 1 of the accompanying drawings, a preferred embodiment of the invention includes a light source and transmitter 10 and a light detector array 12, both controlled by a controller 13. Transmitter 10, in the preferred embodiment, transmits infrared (IR) light, and the individual photodetectors in detector array 12 sense reflected IR. Controller 13 synchronizes the generation and transmission of light pulses at transmitter 10 with application of a common or a global ramp voltage to multiple pixel cells in detector array 12. In a manner described below, light from a transmitted light pulse is reflected from an object 17 and received at array 12, resulting in respective voltage levels being stored at each pixel cell in the array. Each stored voltage level corresponds to the time of reception of the reflected light at that cell. The stored voltage levels are transmitted to the controller for processing and or display of a distance-related image on a video display 15.

Figure 2:
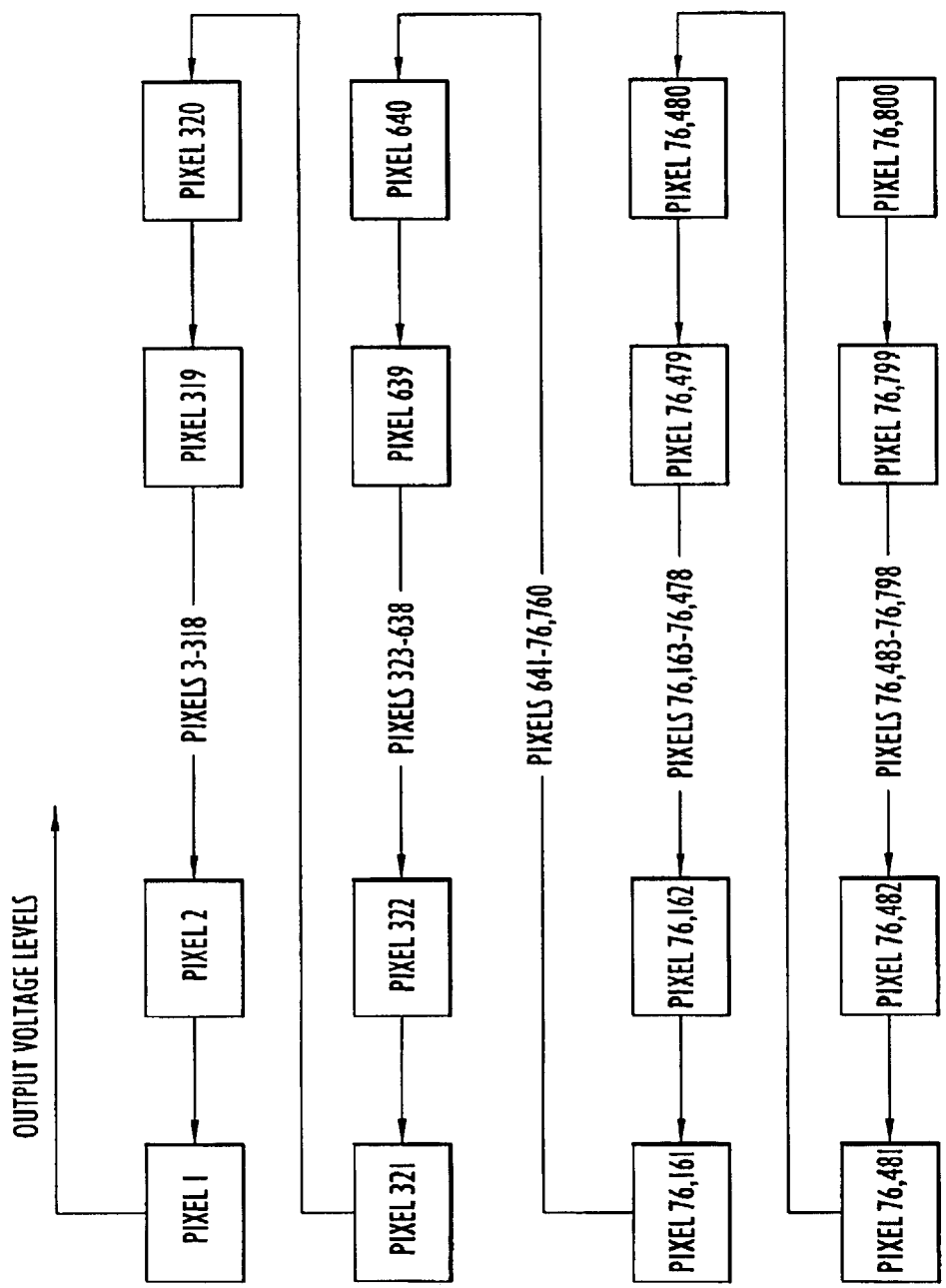
FIG. 2 is a schematic illustration of pixel topography and sequencing for the embodiment of FIG. 1.

The light detector array 12 is illustrated schematically in FIG. 2. In the preferred embodiment of the invention, the array is made up of an x-y array of pixel cells, there being 320 pixel cells in each horizontal (x) row and 240 pixel cells in each vertical (y) column for a total of 76,800 pixel cells. The 320 pixel cells in each horizontal row are connected in series for purposes of shifting their stored voltage levels through the array for processing. Each of the 240 rows is connected serially, so that all 76,800 stored voltage levels can be successively shifted in a conventional manner. Timing and control for the shifting and processing of the voltage levels from the cells is controlled by controller 10 pursuant to the RS-170 video standard or other suitable arrangement.

Figure 3:
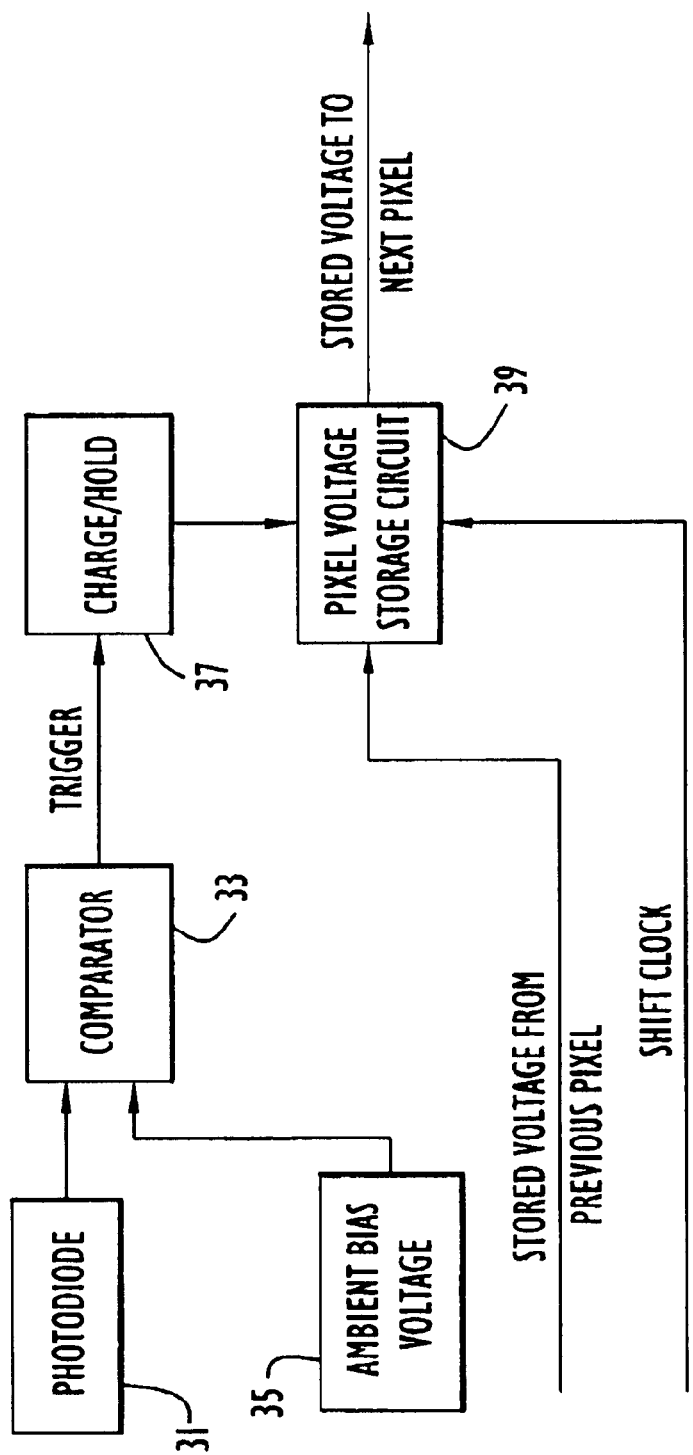
FIG. 3 is a schematic illustration of a typical pixel cell of the present invention.

Each pixel cell has a circuit of the type represented in FIG. 3. Specifically, a photodiode 31, or other transducer of light energy (in this example IR) to voltage, provides a voltage as some function of the intensity of IR energy impinging on the photodiode. This voltage is applied to a voltage comparator 33 which also receives a bias voltage from an ambient bias circuit 35. When the intensity of the IR energy received at photodiode 31 exceeds ambient IR intensity, a trigger signal is generated by comparator 33. The ambient bias voltage can be automatically adjusted in response to continuous sensing of ambient IR energy. Alternatively, the bias may be pre-set or manually adjusted. The important point is that comparator 33 provides a trigger signal only in response to the received light pulse reflected from an object.

The ramp voltage delivered to each pixel cell from controller 13 is applied to a voltage charge/hold circuit 37. Upon generation of the trigger signal at comparator 33, the charge/hold circuit 37 stops charging from the ramp voltage, resulting in a final charge for that pixel cell which is stored in a pixel voltage storage circuit 39 for that cell.

In operation, when the IR energy pulse is transmitted from transmitter 10, the global ramp voltage for the array is initiated. The slope and duration of the ramp voltage are preferably user-adjustable, thereby defining a maximum distance to be captured by the sensor. This feature is analogous to a contrast control in a conventional video system. There is also a global delay between the transmitted light pulse and initiation of the ramp voltage. This is required in order to compensate for internal circuit delays at the photodetectors, comparator and trigger circuits. The delay may be programmable, resulting in the user having a control minimum distance sensed by the apparatus; this is analogous to a brightness control/d.c. offset in standard video systems. In addition to initiating the ramp voltage, the controller generates a reset signal to reset all of the pixel voltage storage circuits 39 and charge/hold circuits 37 in the array.

After reset, each pixel cell has a zero stored voltage. As the ramp voltage then increases, the voltage in each pixel cell increases at exactly the same rate as the ramp voltage. If, at any time during the ramp function, the output voltage from photodiode exceeds the ambient bias, a trigger pulse from comparator 33 is applied to charge/hold circuit 37. The effect of this is to stop the charging at circuit 37 even though the ramp voltage may continue to increase. This final voltage is stored in the pixel voltage circuit 39 until it is needed. At some time prior to transmission of the next light pulse from transmitter 10, the voltage levels stored in all of the pixel voltage circuits 39 of the array are transmitted serially to the controller for processing. Specifically, each pixel voltage circuit 39 becomes a stage of an output shift register, and the data in each such circuit is shifted to the next lower pixel cell stage in response to each shift clock pulse until all 76,800 voltage levels are received at the controller 10. The entire conversion process (i.e., the charging and storage of voltage levels) occurs during the vertical sync interval when no pixel shifting is occurring.

Since the ramp voltage changes linearly with time, the voltage stored at any cell is a linear measure of the combined transmission and reflection times of the light energy received at that cell. Since the speed of light is known, the voltage at any cell can be readily converted to the distance of the object from which the light received by that cell is reflected. Thus, for a viewing range limited to ten feet, the ramp time may be set for approximately twenty nanoseconds. When the photo detector at a particular pixel cell detects the reflected light, that pixel saves the present ramp voltage. Thus, if the portion of an object from which the light was received at the pixel is eight feet away from the array, it will take approximately sixteen nanoseconds for the light pulse to be transmitted and returned to the sensor. (This discussion utilizes a one nanosecond per foot conversion factor for ease of calculation). In this manner, the stored voltage at each pixel cell is related to the time required for the light pulse to be transmitted and then reflected back to that cell. If every pixel cell receives reflections from an object that is more than ten feet away from the sensor (assuming a twenty nanosecond ramp duration), every pixel will be at the maximum voltage. It will be appreciated, therefore, that the user must adjust the ramp duration to achieve the desired range of the unit. The maximum range of the overall device is limited by the photodiode sensitivity and light intensity.

In certain respects the apparatus of the present invention may be looked upon as a depth of field imager. All objects in the field of view, regardless of distance, are registered. The reflected light triggers only the selected pixel, not the entire array. The depth of field to be detected is selected by varying the ramp slew rate. For example, if the time interval for the entire ramp is fifty nanoseconds, the maximum round trip transmission and reflection times correspond to approximately twenty-five feet. Closer objects are detected at the smaller ramp voltages and the far objects at the higher ramp voltages.

Minimum range is limited by the response time of the photodiode circuits. For an object six inches away, for example, the travel time of the light is only one nanosecond. Measuring relative distances at this range is difficult. It may be possible by computer averaging multiple images to reduce the error. There is also a limitation of the maximum ramp rate. The faster the ramp rate, the more error there is in the range calculation.

In the preferred embodiment, the light transmitted from transmitter 10 is infrared (IR). For example, a high intensity IR light emitting diode (LED) array may be used, with brighter sources required for greater distances between the sensor and objects. In video applications the light pulse is transmitted sixty times per second, or once per video field, to render it consistent with typical video monitors.

It must once again be stressed that this system does not record any intensity data whatsoever; instead, the output waveform is an x-y representation of the distance between the object and each sensor pixel.

Although the array of detectors in the preferred embodiment is rectangular, it will be appreciated that any one or two dimensional array configuration may be employed, depending upon the application.

Although the RS-170 video standard and monochrome monitor have been described with the preferred embodiment, it will be appreciated that other applications and standards are possible within the principles of the present invention.

The specific technique of serially shifting pixel voltage values to form the final output signal is also not a limiting feature of the invention. Other specific implementations could include addressable pixels as in a RAM memory, or parallel column and row output configurations, etc. The important feature is not necessarily the technique for combining the pixel circuit voltages as much as the fact that those voltages represent distance.

The preferred embodiment of the invention utilizes a ramp voltage as the timing mechanism. The ramp waveform is preferred because the ramp voltage varies linearly with time, thereby rendering conversion from voltage to time (and ultimately to distance) a trivial calculation. For some applications it may be desirable to utilize measurement waveforms that vary in a nonlinear manner with respect to time (e.g., exponentially, hyperbolically, etc.). The only limitation in this regard is that the voltage must not be repetitive during the measurement interval in order that each voltage level may be identified as a particular time in the measurement interval. Likewise, although voltage is a convenient measurement parameter, other time-varying measurement parameters, such as frequencies, current, etc., may be utilized.

The preferred embodiment of the invention is described as using infrared or other light energy. It should be understood that any electromagnetic energy, or other energy having a known velocity in the ambient transmission medium, may be utilized. In the preferred embodiment the light transmitter and sensor are both at the same location so that one need only divide total transit time (i.e., transmission plus reflection times) in half to provide a measure of the distance between the sensor location and the object. It is contemplated that, for some applications, the transmitter and sensor array may not be positioned at the same location. For such applications it will be necessary to compensate for the location differences in order to compute distance as a function of the combined transmission and reflection times.

The present invention is a new and improved method and apparatus for imaging objects as a function of range rather than intensity, thereby simplifying imaging systems since backgrounds beyond a certain distance can be ignored. The system has numerous advantages for certain types of applications, including virtual reality database generation, factory automation, speed detection, machine automated positioning, surveying equipment, leveling equipment, pattern recognition equipment, surveillance systems, computer game interfaces, collision detection, range finding/targeting, etc.

For certain applications a calibration mode may be required to null out differences in the various pixels comprising the array. That is, even if the sensor is directed at a flat wall, there may be variations from pixel to pixel due to noise or process irregularities. Calibration can be readily accomplished by aiming the sensor at a flat surface and recording the average pixel distance. The resulting look-up table can be utilized at a weighting table for measuring actual images.

Having described preferred embodiments of a new and improved method and apparatus for imaging objects as a function of their distances from a scanner or the like, it is believed that other modifications, variations and changes will be suggested to persons skilled in the art in view of the teachings set forth herein. It is therefore to be understood that all such variations, modifications and changes are believed to fall within the scope of the present invention as defined by the appended claims.

What is claimed is:

1. A method for imaging objects located within a predetermined range from a sensor having multiple individual energy wave detectors disposed in a predetermined array, said method comprising the steps of:
   (a) transmitting a pulse Of said energy in the general direction of said objects;
   (b) in time synchronization with transmission of said energy pulse in step (a), initiating a global time-varying measurement signal having a predetermined duration and a specified parameter with a value that both varies with time and is non-repetitive throughout said predetermined duration;
   (c) receiving respective reflections of said energy pulse from said objects at detectors in said array;
   (d) at each detector, storing the value of said global measurement signal parameter at the time of reception of said reflection in step (c); and
   (e) representing said objects as a function of the parameter values stored at said detectors.

2. The method of claim 1 wherein step (e) comprises generating an output signal with a waveform corresponding to the stored measurement parameter values at each detector arranged in a predetermined sequence related to the positions of the detectors in said array.

3. The method of claim 1 wherein said array is a generally rectangular array of rows and columns of said detectors and wherein said predetermined sequence is the row by row positioning of said detectors in said array.

4. The method of claim 1 wherein step (a) comprises transmitting a pulse of light energy having a known frequency, wherein said detectors are photodetectors responsive to light energy at said known frequency.

5. The method of claim 4 wherein said global measurement signal is a ramp voltage with a voltage amplitude that varies linearly with time throughout said predetermined duration; and
   wherein step (e) comprises representing said objects in a visibly perceptible format.

6. The method of claim 5 wherein said detectors are arranged in a rectangular array of columns and rows, each detector corresponding to a pixel of light energy received in step (c).

7. The method of claim 1 wherein step (b) comprises generating said global measurement signal as a time varying voltage signal, and wherein said specified parameter is the amplitude of the voltage signal.

8. The method of claim 7 wherein said voltage signal is a ramp function with a voltage amplitude that varies linearly with time throughout said predetermined duration.

9. Apparatus for imaging objects located within a predetermined range, comprising:
   a sensor having multiple individual energy wave detectors disposed in a predetermined array;
   a transmitter for transmitting a pulse of said energy in the general direction of said objects;
   a measurement signal generator for generating a global time-varying measurement signal in time synchronization with transmission of said energy pulse by said transmitter, said global time-varying measurement signal having a predetermined duration and a specified parameter with a value that both varies with time and is non-repetitive throughout said predetermined duration;

wherein said multiple detectors receive respective reflections of said energy pulse from said objects as a function of the position of the detectors in said array relative to the object;

at each detector, a storage circuit for storing the value of said global measurement signal parameter at the time of reception of said reflection by that detector; and output means for providing an output signal having a waveform corresponding to the stored values of said measurement signal parameter at said multiple detectors.

10. The apparatus of claim 9 wherein said transmitter comprises a transmitter of a pulse of light energy having a known frequency, wherein said detectors are photodetectors responsive to light energy at said known frequency.

11. The apparatus of claim 10 wherein said global measurement signal is a ramp voltage with a voltage amplitude that varies linearly with time throughout said predetermined duration; and further comprising means responsive to said output signal for representing said objects in a visibly perceptible format.

12. The apparatus of claim 11 wherein said detectors are arranged in a rectangular array of columns and rows, each detector corresponding to a pixel of light energy received by said photodetectors.

13. The apparatus of claim 9 wherein said measurement signal generator includes means for generating said global measurement signal as a time varying voltage signal, and wherein said specified parameter is the amplitude of the voltage signal.

14. The apparatus of claim 13 wherein said voltage signal is a ramp function with a voltage amplitude that varies linearly with time throughout said predetermined duration.

15. A time of flight measurement system used with a generator outputting at least a first light pulse to determine a distance between said system and a target within a system field of view comprising:

an array of pixel detectors optically enveloping said system field of view, wherein said pixel detectors detect, in parallel, generated light pulse energy returned from said target;

for each of said pixel detectors, an associated charge collector to collect charge in accordance with detected optical energy reflected from said target resulting from said first pulse, wherein each pixel detector is associated with a different charge collector, and for each pixel detector an associated trigger coupled to said charge collector associated with that pixel detector to control ability of said associated charge collector to collect charge; and an evaluation unit for evaluating accumulated charge accumulated in each said collector to obtain a measure of actual time of flight for each said pixel detector to said target;

wherein said distance to said target may be determined.

16. The system of claim 15, further including:

a measurement signal generator for generating a time-varying measurement signal in time synchronization with transmission of said first pulse, said time varying measurement signal having a predetermined duration and a specified parameter with a value that both varies with time and is non-repetitive throughout said predetermined duration, wherein said measurement signal is supplied to each said charge collector to enable said charge collector to accumulate charge.

17. The system of claim 16, wherein said measurement signal generator includes means for generating said measurement signal as a time varying voltage signal, and wherein said specified parameter is the amplitude of the voltage signal.

18. The system of claim 17, wherein said voltage signal is a ramp function with a voltage amplitude that varies linearly with time throughout said predetermined duration.

19. A method to determine a distance between a detector array and a target within a field of view comprising the steps of:

(a) disposing said array so as to detect optical energy reflected from said target, the array comprising a plurality of pixel detectors optically enveloping said field of view and detecting, in parallel, said reflected optical energy, and for each pixel detector providing an associated charge collector, wherein each pixel detector is associated with a different charge collector, and for each pixel detector an associated trigger coupled to said charge collector associated with that pixel detector to control ability of said associated charge collector to collect charge;

(b) illuminating said target with a first pulse of optical energy and enabling each said charge collector to collect charge in accordance with detected optical energy reflected from said target resulting from said pulse;

(c) beginning at said target illumination to accumulate charge in each said collector;

(d) disabling each said associated collector from accumulating further charge via an associated trigger; and (e) evaluating charge accumulated in each said collector to obtain a measure of actual time of flight for each said pixel detector to said target;

wherein said distance to said target may be determined.

20. The method of claim 19, wherein step (c) further includes:

(c.1) in time synchronization with transmission of said first pulse of optical energy, initiating a time-varying measurement signal having a predetermined duration and a specified parameter with a value that both varies with time and is non-repetitive throughout said predetermined duration, wherein said measurement signal is supplied to each said charge collector to enable said charge collector to accumulate charge.

21. The method of claim 20, wherein step (c.1) further includes:

(c.1.1) generating said measurement signal as a time varying voltage signal, and wherein said specified parameter is the amplitude of the voltage signal.

22. The method of claim 21, wherein said voltage signal is a ramp function with a voltage amplitude that varies linearly with time throughout said predetermined duration.

* * * * *